United States Patent
Han (10) Patent No.: US 11,143,405 B2
(45) Date of Patent: Oct. 12, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Dongsik Han, Changwon-si (KR)

(*) Notice: Subject to any disclaimer, the term of this patent is extended or adjusted under 35 U.S.C. 154(b) by 155 days.

(21) Appl. No.: 16/163,510

(22) Filed: Oct. 17, 2018

(65) Prior Publication Data

US 2019/0128525 A1 May 2, 2019

(30) Foreign Application Priority Data

Oct. 31, 2017 (KR) .................. 10-2017-0144200

(51) Int. Cl.
| | |
|---|---|
| *F23R 3/14* | (2006.01) |
| *F23R 3/28* | (2006.01) |
| *F23R 3/16* | (2006.01) |
| *F23R 3/10* | (2006.01) |
| *F23M 9/02* | (2006.01) |

(52) U.S. Cl.
CPC .................. *F23R 3/14* (2013.01); *F23R 3/10* (2013.01); *F23R 3/16* (2013.01); *F23R 3/286* (2013.01); *F05D 2240/127* (2013.01); *F23M 9/02* (2013.01)

(58) Field of Classification Search
CPC . F23D 2900/14021; F23D 2900/14701; F23R 3/14; F23R 3/283; F23R 3/286
See application file for complete search history.

(56) References Cited

U.S. PATENT DOCUMENTS

| | | | |
|---|---|---|---|
| 6,026,645 A | 2/2000 | Stokes et al. | |
| 2010/0101229 A1* | 4/2010 | York | F23R 3/286 60/737 |
| 2011/0113783 A1* | 5/2011 | Boardman | F23C 13/06 60/723 |
| 2012/0011854 A1* | 1/2012 | Khan | F23R 3/283 60/772 |
| 2014/0338338 A1* | 11/2014 | Chila | F23R 3/10 60/737 |
| 2014/0338340 A1* | 11/2014 | Melton | F23D 14/62 60/738 |
| 2017/0130962 A1 | 5/2017 | Inoue et al. | |

FOREIGN PATENT DOCUMENTS

| | | |
|---|---|---|
| JP | 2013-221737 A | 10/2013 |
| JP | 2013-231582 A | 11/2013 |

* cited by examiner

*Primary Examiner* — Scott J Walthour
*Assistant Examiner* — David P. Olynick
(74) *Attorney, Agent, or Firm* — Harvest IP Law, LLP (57) ABSTRACT

The combustor includes a nozzle casing, and combustion nozzles disposed at position spaced apart from each other in the nozzle casing and configured to mix fuel with compressed air and eject the mixture, Where each of the combustion nozzles includes, a nozzle shroud including an inlet through which the compressed air is drawn into the nozzle shroud, and an outlet through which the compressed air is discharged out of the nozzle shroud, an injection cylinder disposed in the nozzle shroud and configured to allow the fuel to be injected into the injection cylinder, and swirlers disposed on an outer circumferential surface of the injection cylinder, where the nozzle shroud includes a region having a constant diameter from the inlet to a predetermined distance along a longitudinal direction of the nozzle shroud.

16 Claims, 9 Drawing Sheets

COMBUSTOR AND GAS TURBINE INCLUDING THE SAME

CROSS-REFERENCE TO RELATED APPLICATION(S)

This application claims priority to Korean Patent Application No. 10-2017-0144200 filed on Oct. 31, 2017, the disclosure of which is hereby incorporated by reference herein in its entirety.

FIELD

Exemplary embodiments of the present disclosure relate to a combustor and a gas turbine including the combustor.

BACKGROUND

The statements in this section merely provide background information related to the present disclosure and do not constitute prior art.

A gas turbine is a power engine configured to mix fuel with air compressed by a combustor, combust the mixture of the fuel and the compressed air, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air thereinto, compresses the air, and then transfers the compressed air to the combustor. Air compressed by the compressor enters into a high-pressure and high-temperature state. The combustor mixes fuel with compressed air supplied from the compressor, and combusts the mixture of the fuel and the compressed air. Combustion gas (i.e., the combusted mixture of the fuel and the compressed air) generated by the combustion is discharged to the turbine. The inventor(s) notes that turbine blades provided in the turbine are rotated by the combustion gas, whereby power is generated. The inventor(s) notes that generated power may be used in various fields, e.g., for generating electricity, driving a mechanical device, etc.

SUMMARY

In accordance with one aspect of the present disclosure, a combustor may include a nozzle casing, and a plurality of combustion nozzles disposed at position where the combustion nozzles are disposed to be spaced apart from each other in the nozzle casing. The combustion nozzles are configured to mix fuel with compressed air to make a mixture of the fuel and the compressed air, and eject the mixture. Each of the plurality of combustion nozzles may include: a nozzle shroud including an inlet through which the compressed air is drawn into the nozzle shroud, and an outlet through which the compressed air drawn from the inlet is discharged out of the nozzle shroud; an injection cylinder disposed in the nozzle shroud and extending in one direction and configured to allow the fuel to be injected into the injection cylinder; and a plurality of swirlers disposed on an outer circumferential surface of the injection cylinder at positions spaced apart from each other along a circumferential direction of the injection cylinder, and configured to discharge the fuel supplied from the injection cylinder. Herein, the nozzle shroud may include a region having a constant diameter from the inlet to a predetermined distance along a longitudinal direction of the nozzle shroud.

In accordance with one aspect of the present disclosure, a combustor may include a nozzle casing, and a plurality of combustion nozzles disposed at position where the combustion nozzles are disposed to be spaced apart from each other in the nozzle casing. The combustion nozzles are configured to mix fuel with compressed air to make a mixture of the fuel and the compressed air, and eject the mixture. Each of the plurality of combustion nozzles include: a nozzle shroud including an inlet through which the compressed air is drawn into the nozzle shroud, and an outlet through which the compressed air drawn from the inlet is discharged out of the nozzle shroud; an injection cylinder disposed in the nozzle shroud and extending in one direction and configured to allow the fuel to be injected into the injection cylinder; and a plurality of swirlers disposed on an outer circumferential surface of the injection cylinder at positions spaced apart from each other along a circumferential direction of the injection cylinder, and configured to discharge the fuel supplied from the injection cylinder. Herein, a plurality of through holes passing through the nozzle shroud are formed in a region of the nozzle shroud that is adjacent to the inlet.

In accordance with another aspect of the present disclosure, a gas turbine may include a compressor configured to compress air drawn thereinto from an outside, a combustor configured to mix fuel with the air compressed by the compressor to make a mixture of the fuel and the compressed air and combust the mixture of the fuel and the compressed air, and a turbine including a plurality of turbine blades configured to be rotated by combustion gas formed by the combustor. Herein, the combustor may include a nozzle casing, and a plurality of combustion nozzles disposed at position where the combustion nozzles are disposed to be spaced apart from each other in the nozzle casing. And the combustion nozzles are configured to mix the fuel with the compressed air and eject the mixture. Each of the plurality of combustion nozzles may include: a nozzle shroud including an inlet through which the compressed air is drawn into the nozzle shroud, and an outlet through which the compressed air drawn from the inlet is discharged out of the nozzle shroud; an injection cylinder disposed in the nozzle shroud and extending in one direction and configured to allow the fuel to be injected into the injection cylinder; and a plurality of swirlers disposed on an outer circumferential surface of the injection cylinder at positions spaced apart from each other along a circumferential direction of the injection cylinder, and configured to discharge the fuel supplied from the injection cylinder. Herein, the nozzle shroud may include a region having a constant diameter from the inlet to a predetermined distance along a longitudinal direction of the nozzle shroud.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

The present disclosure is to provide a combustor in which fuel and compressed air is evenly mixed with each other in a combustion nozzle, and a gas turbine including the combustor.

Since the present disclosure may be modified in various forms, and may have various embodiments, exemplary embodiments will be illustrated in the accompanying drawings and described in detail with reference to the drawings. However, exemplary embodiments are not intended to limit the present disclosure to particular modes of practice, and are to be appreciated that all changes, equivalents, and substitutes that do not depart from the spirit and technical scope of the claimed invention are encompassed in the present disclosure.

The terminology used herein is for the purpose of describing particular embodiments only and is not intended to be limiting its meaning itself. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, exemplary embodiments of the present disclosure will be described in detail with reference to the accompanying drawings. Reference now should be made to the drawings, in which the same reference numerals are used throughout the different drawings to designate the same or similar components. Details of well-known configurations and functions may be omitted solely for purpose of concise descriptions to thereby avoid unnecessarily obscuring the gist of the present disclosure. For the same reason as addressed above, in the accompanying drawings, some elements are enlarged, omitted, or depicted schematically.

Hereinafter, a gas turbine in accordance with an embodiment of the present disclosure will be described with reference to FIGS. 1 to 5.

Figure 1:
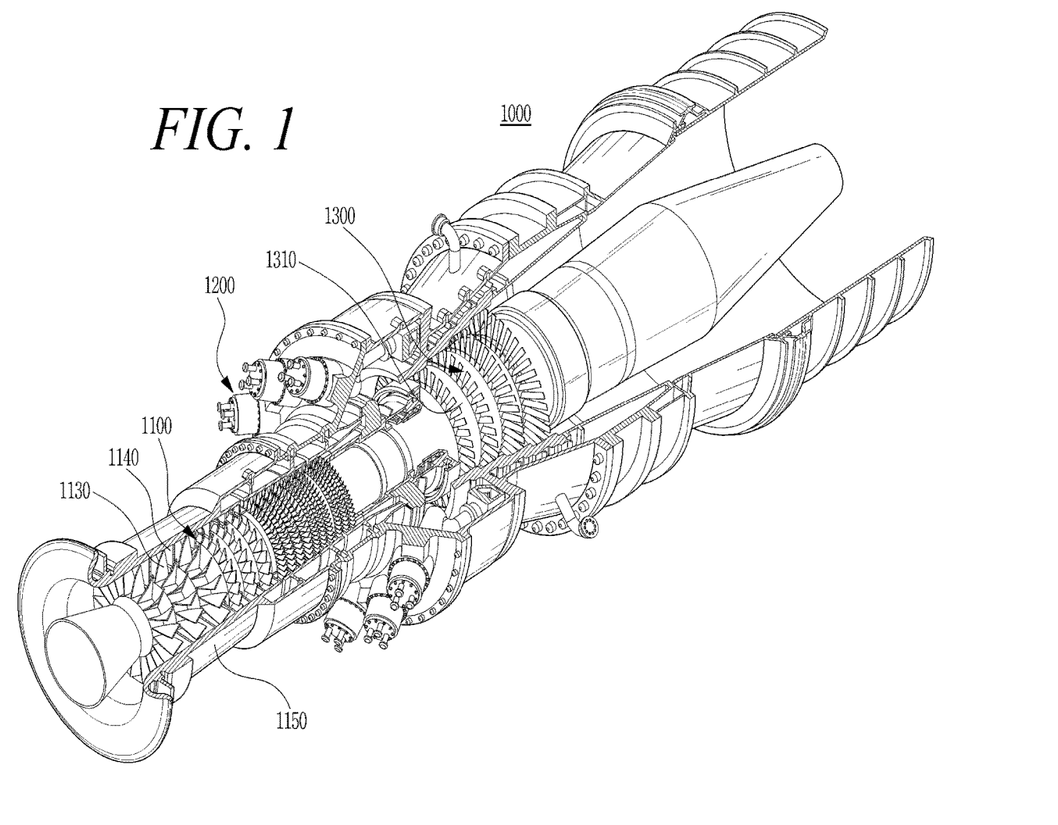
FIG. 1 is a diagram illustrating an internal structure of a gas turbine in accordance with an embodiment of the present disclosure.
Figure 2:
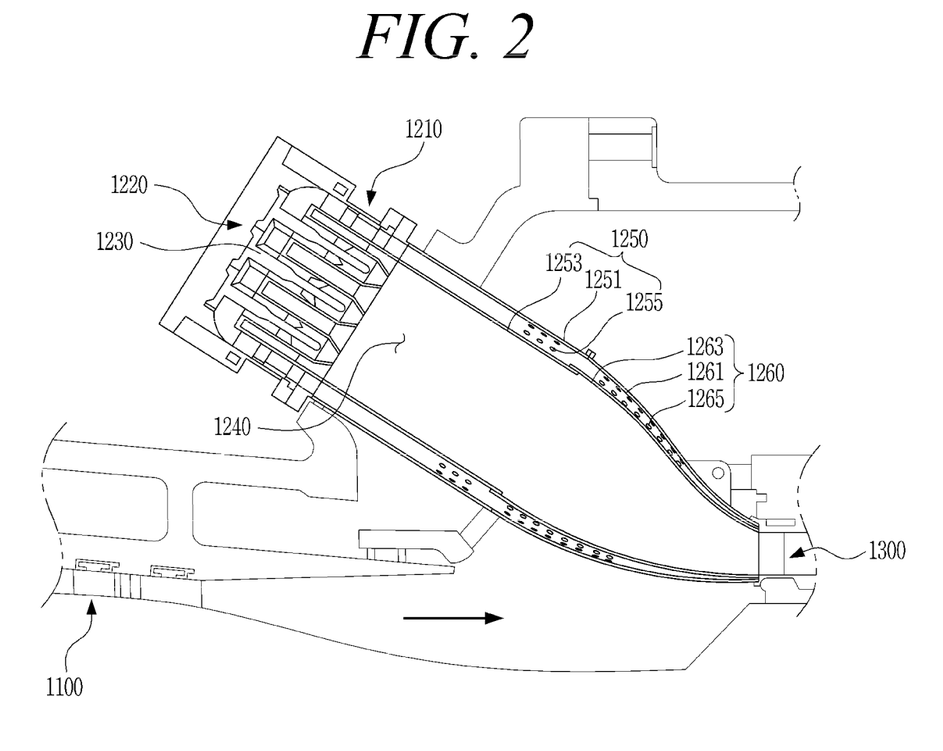
FIG. 2 is a sectional view schematically illustrating a combustor of FIG. 1.
Figure 3:
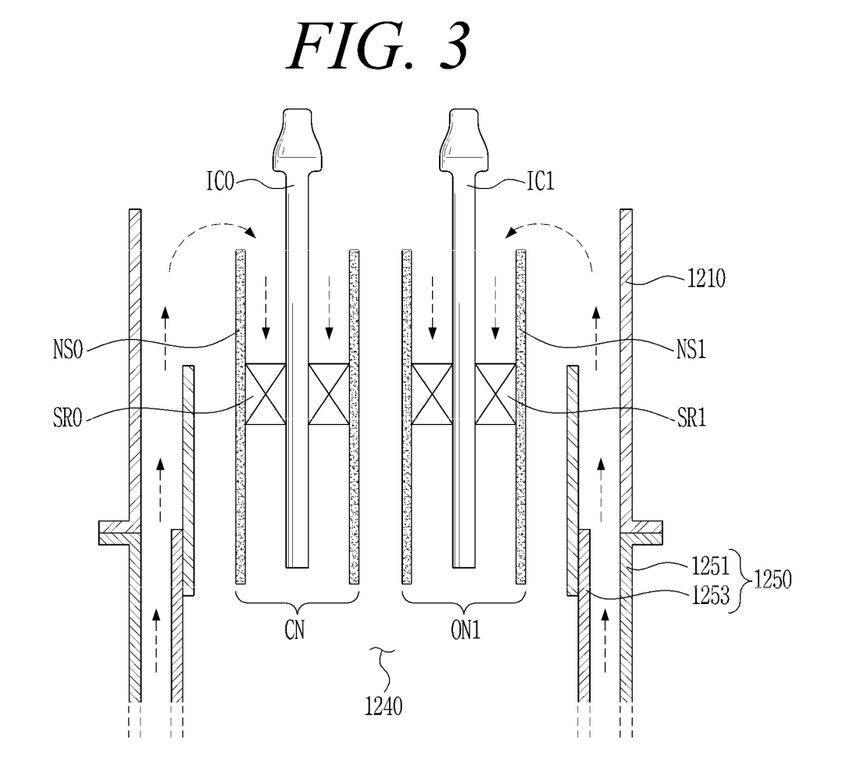
FIG. 3 is a sectional view schematically illustrating internal structures of a combustion nozzle and a liner in accordance with the present disclosure.
Figure 4:
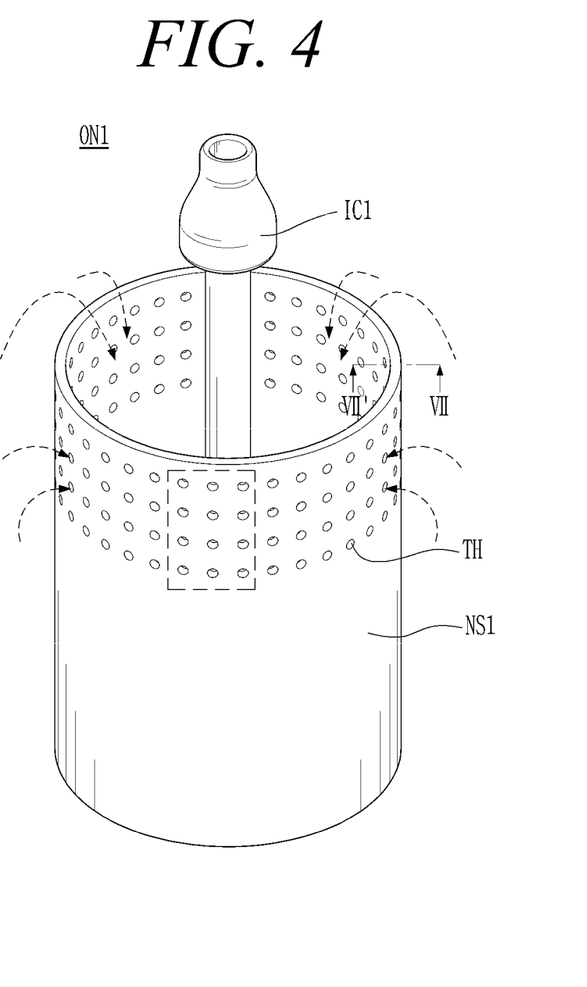
FIG. 4 is a perspective view schematically illustrating the combustion nozzle of FIG. 3.
Figure 5:
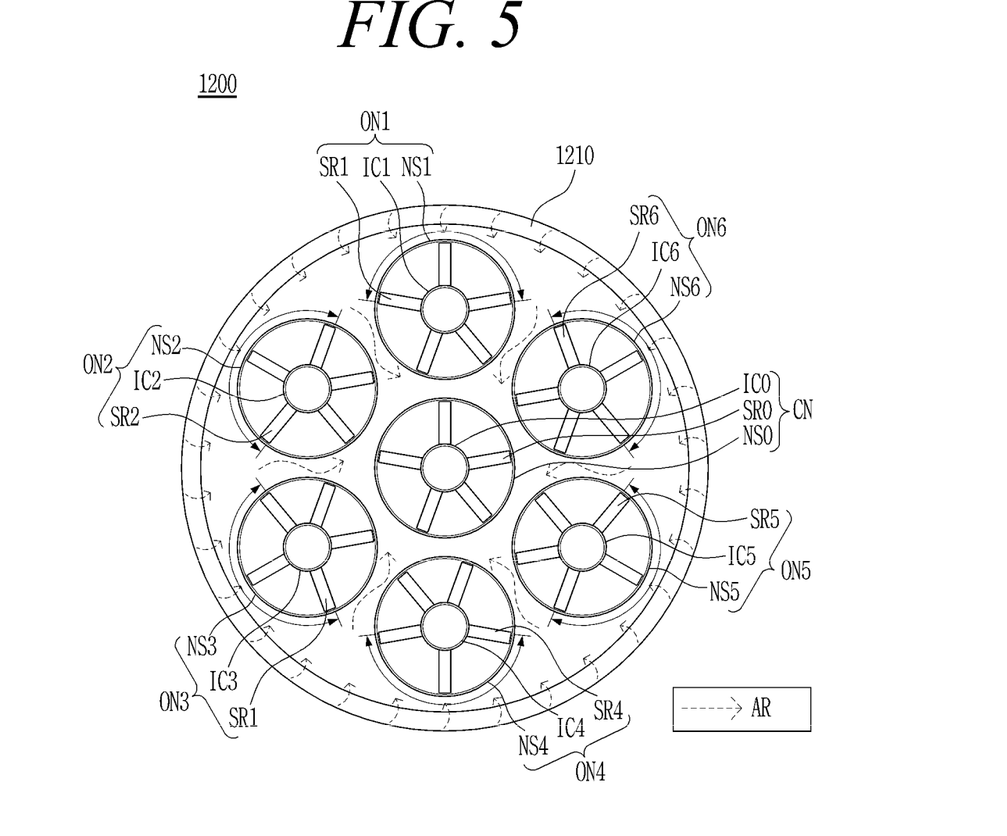
FIG. 5 is a diagram illustrating an arrangement structure of a plurality of combustion nozzles disposed in the combustor in accordance with the present disclosure.

FIG. 1 is a diagram illustrating an internal structure of the gas turbine in accordance with an embodiment of the present disclosure, and FIG. 2 is a sectional view schematically illustrating a combustor of FIG. 1. FIG. 3 is a sectional view schematically illustrating internal structures of a combustion nozzle and a liner in accordance with the present disclosure, FIG. 4 is a perspective view schematically illustrating the combustion nozzle of FIG. 3, and FIG. 5 is a diagram illustrating an arrangement structure of a plurality of combustion nozzles disposed in the combustor.

Referring to FIGS. 1 to 5, the gas turbine 1000 in accordance with an exemplary embodiment of the present disclosure may include a compressor 1100, a combustor 1200, and a turbine 1300. In the combustion 1200 which mixes compressed air and fuel to make a mixture of the compressed air and the fuel with each other and combusts the mixture, nozzle shrouds NS0 to NS6 enclosing respective injection cylinders IC0 to IC6 are respectively disposed in a plurality of combustion nozzles CN and ON1 to ON6 disposed in a nozzle casing 1210. Each of the nozzle shrouds NS0 to NS6 may be formed of a tubular member having a constant diameter. Here, since each of the nozzle shrouds NS0 to NS6 is formed of a tubular member having a constant diameter, a flow separation phenomenon with regard to introduced compressed air may be mitigated, and fuel and compressed air may be uniformly mixed with each other.

The thermodynamic cycle of the gas turbine 1000 according to the exemplary embodiment ideally complies with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air, combust fuel under isobaric conditions to emit (produce or output) energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection. Embodying the Brayton cycle, the gas turbine 1000 may include a compressor, a combustor, and a turbine, as shown in FIG. 1. Although the following description will be made with reference to FIG. 1, the description of the present disclosure may also be widely applied to a turbine engine having a configuration equivalent to that of the gas turbine 1000 illustrated in FIG. 1.

Referring to FIG. 1, the compressor 1100 of the gas turbine 1000 may draw air thereinto from the outside and compress the air. The compressor 1100 may supply air compressed by compressor blades 1130 to the combustor 1200 and also supply air for cooling to a high-temperature area needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 shown in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to vanes 1140 disposed at a following stage. Air is compressed gradually to high pressures while passing through the blades 1130 formed in a multi-stage structure.

The vanes 1140 may be mounted to an inner surface of the housing 1150 in such a way that a plurality of vanes 1140 form each stage. The vanes 1140 guide compressed air transferred from the compressor blades 1130 disposed at the preceding stage, toward the compressor blades 1130 disposed at the following stage. In the exemplary embodiment, at least some of the plurality of vanes 1140 may be mounted to be rotatable within a predetermined range, e.g., to adjust the flow rate of air.

The compressor 1100 may be operated using some of the power output from the turbine 1300. To this end, as shown in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

The combustor 1200 may mix fuel with compressed air, supplied from an outlet of the compressor 1100, to make a mixture of the fuel and compressed air, and combusts the mixture through an isobaric combustion process to make combustion gas having high energy. FIG. 2 illustrates an exemplary embodiment of the combustor 1200 applied to the gas turbine 1000.

Referring to FIG. 2, the combustor 1200 in accordance with the present embodiment may be disposed at a downstream side of the compressor 1100, and include a plurality of burners 1220, a plurality of liners 1250, and a plurality of transition pieces 1260. Here, one liner 1250 and one transition piece 1260 which are coupled in series to each other may form one combustion chamber in the combustor 1200. On the one hand, one burner 1220 and one combustion chamber which are coupled to each other may form one combustion can in the combustor 1200. In other words, the combustor 1200 may be formed of a plurality of combustion cans.

The plurality of burners 1220 may be disposed along nozzle casings 1210 arranged in an annular shape. In detail, the plurality burners 1220 may be respectively disposed in a plurality of nozzles casings 1210 disposed along an annular imaginary line at positions spaced apart from each other. A plurality of combustion nozzles 1230 are provided in each burner 1220. Fuel ejected from the combustion nozzles 1230 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions suitable for reducing the amount of exhaust gas such as carbon monoxide and nitrogen oxide, which should be regulated by law. Recently, use of a pre-mixed combustion scheme has increased because a combustion temperature can be reduced and uniform combustion is possible so that exhaust gas can be reduced, although it is difficult to control the pre-combustion.

In the gas turbine 1000 according to the present embodiment, the pre-mixed combustion scheme is employed, so that compressed air is mixed with fuel ejected in advance from the combustion nozzles 1230, and then enters the combustion chamber 1240.

Referring to FIGS. 3 to 5, the plurality of combustion nozzles 1230 (refer to FIG. 2) are disposed in each nozzle casing 1210. The plurality of combustion nozzles 1230 (refer to FIG. 2) may include a central nozzle CN, and a plurality of main nozzles ON1 to ON6.

The plurality of main nozzles ON1 to ON6 may be disposed in the nozzle casing 1210 in such a way that the plurality of main nozzles ON1 to ON6 encloses the central nozzle CN. Here, the plurality of main nozzles ON1 to ON6 are disposed at positions spaced apart from each other, and may be located adjacent to an inner circumferential surface of the nozzle casing 1210. Fuel and compressed air are mixed with each other in the plurality of main nozzles ON1 to ON6, and the mixture of the fuel and the compressed air may be injected into the combustion chamber 1240. Referring to FIG. 5, although six main nozzles ON1 to ON6 are illustrated as being arranged around the central nozzle CN, the number of main nozzles ON1 to ON6 is not limited thereto, and the number of disposed main nozzles may be increased or reduced.

Each of the plurality of main nozzles ON1 to ON6 may include a nozzle shroud NS1 to NS6, an injection cylinder IC1 to IC6, and a plurality of swirlers SR1 to SR6.

Each nozzle shroud NS1 to NS6 may be a member enclosing the injection cylinder IC1 to IC6 and the plurality swirlers SR1 to SR6, and may extend along a direction in which compressed air and fuel are ejected. As shown in FIG. 3, compressed air drawn through the liner 1250 may be supplied into the nozzle shroud NS1.

According to the present embodiment, each nozzle shroud NS1 to NS6 may be formed of a tubular member having a constant diameter. The nozzle shroud NS1 to NS6 may include an inlet through which compressed air is drawn, and an outlet through which the compressed air is discharged. In FIG. 3, an upper portion of the nozzle shroud NS1 may correspond to the inlet, and a lower portion of the nozzle shroud NS1 corresponds to the outlet.

In the present embodiment, the diameter of at least an upper region of the nozzle shroud NS1 is constant. In other words, the diameter of a portion of the nozzle shroud NS1 from the inlet to a predetermined position is constant. In FIG. 3, although the diameter of the entirety of the nozzle shroud NS1 is illustrated as being constant, it is not limited thereto, and the diameter of the nozzle shroud NS1 is constant in only some section (upper region) thereof from the inlet to the predetermined position.

Figure 6:
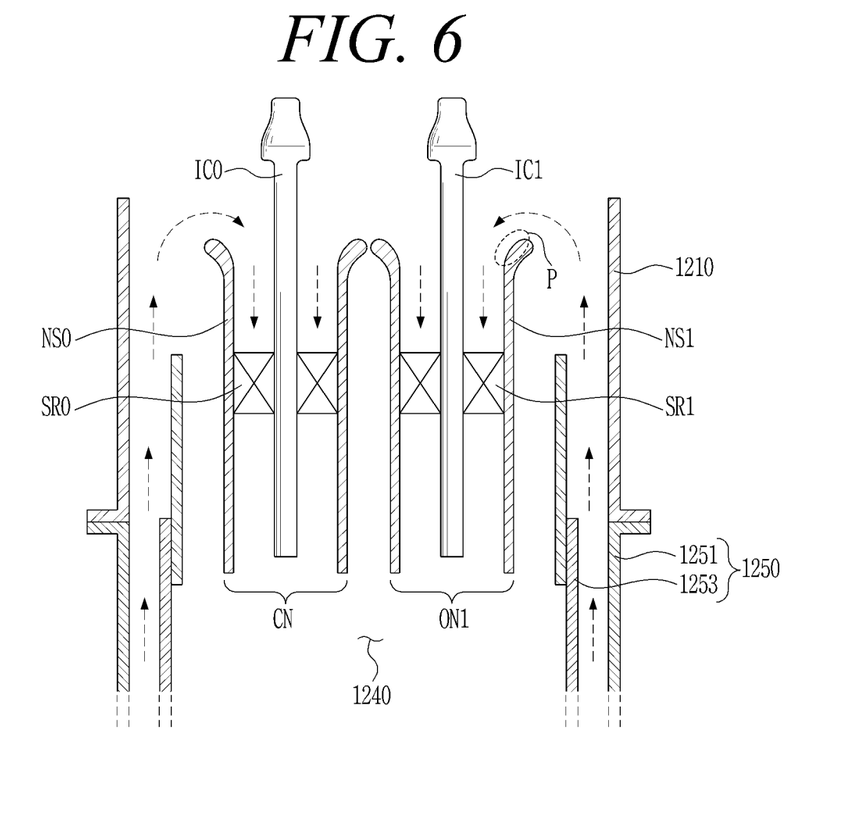
FIG. 6 is a sectional view schematically illustrating internal structures of a combustion nozzle and a liner in accordance with a conventional art.

According to the present embodiment, since each nozzle shroud NS1 to NS6 has a constant diameter in the some section (upper region) from the inlet to the predetermined position, exemplary embodiments of the present application obtain advantageous effects that flow separation with respect to compressed air may be prevented from occurring around the inlet of each nozzle shroud NS1 to NS6. As shown in FIG. 6, since the conventional nozzle shroud NS1 has a shape (bell mouth shape) in which the diameter thereof increases toward the inlet, flow separation with respect to compressed air may occur in an inlet vicinity P. Hence, in the inlet of the conventional nozzle shroud NS1, slipstreams (or vortex steams) occur, whereby compressed air and fuel may not be effectively mixed with each other in the nozzle shroud NS1.

In the present embodiment, due to the shape of each nozzle shroud NS1 to NS6, exemplary embodiments of the present application obtain advantageous effects that flow separation of compressed air which may occur around the inlet of the nozzle shroud NS1 to NS6 may be prevented. Accordingly, compressed air may be smoothly drawn into the nozzle shroud NS1 to NS6, and compressed air and fuel may be uniformly mixed with each other in the nozzle shroud NS1 to NS6.

On the one hand, referring again to FIGS. 3 to 5, a plurality of through holes TH may be formed in the upper region of each nozzle shroud NS1 to NS6 having a constant diameter. The plurality of through holes TH may be holes passing through the nozzle shroud NS1 to NS6, so that compressed air drawn into the nozzle casing 120 may be supplied into the nozzle shroud NS1 to NS6 through the plurality of through holes TH. Thereby, compressed air may be drawn into the nozzle shroud NS1 to NS6 not only through the inlet of the nozzle shroud NS1 to NS6 but also in a lateral direction of the nozzle shroud NS1 to NS6.

In the present embodiment, the plurality of through holes TH may be formed in an entire section along a circumferential direction of each nozzle shroud NS1 to NS6. However, the present disclosure is not limited to this. As shown in FIG. 5, the plurality of through holes TH may be formed only some section (indicated by the arrows) along the circumferential direction of each nozzle shroud NS1 to NS6. In other words, the plurality of through holes TH may be formed on a portion of a circumferential surface of each nozzle shroud NS1 to NS6 that faces an inner circumferential surface of the nozzle casing 1210.

Figure 7A:
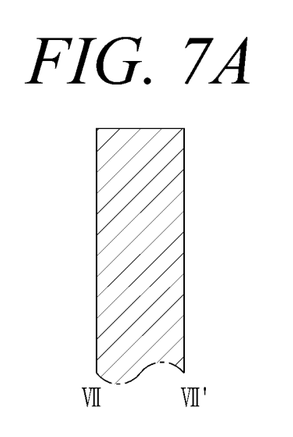
FIG. 7A, FIG. 7B, and FIG. 7C illustrate various sectional views taken along line VII-VII' of FIG. 4.
Figure 7B:
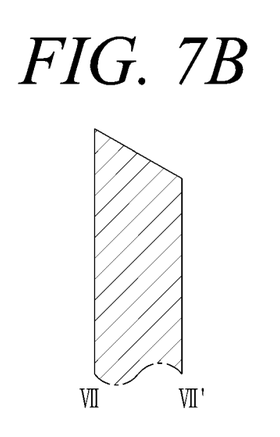
Figure 7C:
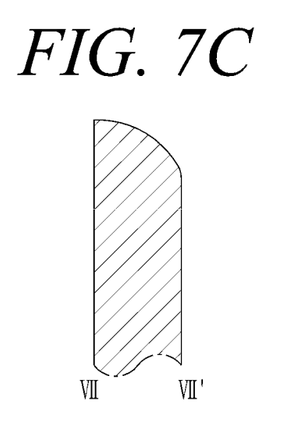

Referring to FIG. 7A, FIG. 7B, and FIG. 7C, an inlet-side end of each nozzle shroud NS1 to NS6 may have a rectangular sectional shape (refer to FIG. 7A). Alternatively, the inlet-side end of each nozzle shroud NS1 to NS6 may have a tapered sectional shape (refer to FIG. 7B) or a round sectional shape (refer to FIG. 7C).

Here, the end of the nozzle shroud NS1 to NS6 having a tapered or round sectional shape faces an inside of the nozzle shroud NS1 to NS6. In other words, a tapered surface or round surface of the end of the nozzle shroud NS1 to NS6 may be oriented toward the inside of the nozzle shroud NS1 to NS6.

In the present embodiment, although one side of the end of each nozzle shroud NS1 to NS6, i.e., a side surface of the nozzle shroud NS1 to NS6 that faces the inside of the nozzle shroud NS1 to NS6, has a tapered shape or a round shape, it is not limited thereto. For example, both sides of the end of each nozzle shroud NS1 to NS6, i.e., both an inner side and an outer side of the end of the nozzle shroud NS1 to NS6, may have tapered shapes or round shapes.

Figure 8:
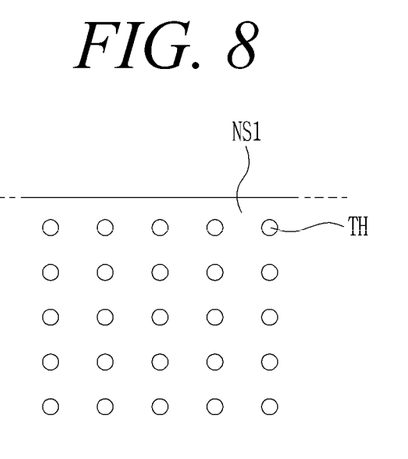
FIGS. 8 to 10 are diagrams illustrating various modifications of a plurality of through holes formed in a nozzle shroud in accordance with the present disclosure.
Figure 9:
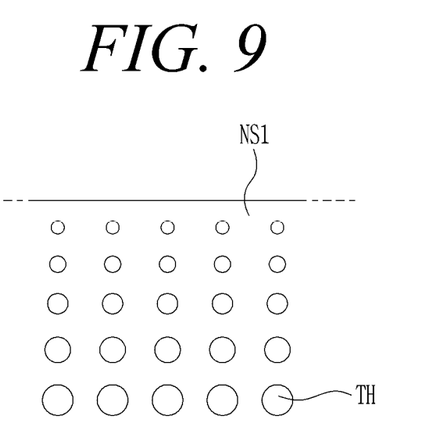
Figure 10:
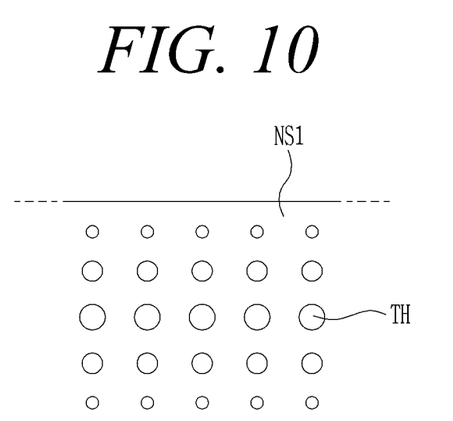

Referring to FIGS. 8 to 10, each of the plurality of through holes TH formed in each nozzle shroud NS1 to NS6 may have a circular shape. In the present embodiment, the plurality of through holes TH in each nozzle shroud NS1 to NS6 may be arranged in various shapes. As shown in FIG. 8, the plurality of through holes TH may have the same diameter. Alternatively, as shown in FIG. 9, the diameters of the plurality of through holes TH may gradually increase from the inlet to an outlet. As a further alternative, as shown in FIG. 10, the diameters of the plurality of through holes TH may gradually increase from the inlet to a predetermined position and then gradually reduce from the predetermined position to an outlet.

Referring again to FIGS. 3 to 5, each of the injection cylinders IC1 to IC6 may be disposed in an internal central portion of the corresponding one of the nozzle shrouds NS1 to NS6, and may be coupled to a fuel injector (not shown) and supplied with fuel required for combustion. The injection cylinders IC1 to IC6 may extend parallel to the nozzle shrouds NS1 to NS6.

On the one hand, the plurality of swirlers SR1 to SR6 to be used to inject fuel into the corresponding nozzle shroud NS1 to NS6 may be disposed on an outer circumferential surface of each injection cylinder IC1 to IC6. Fuel injected into the nozzle shroud NS1 to NS6 by the plurality of swirlers SR1 to SR6 may be mixed with compressed air drawn into the nozzle shroud NS1 to NS6. Here, compressed air and fuel may be swirled by the plurality of swirlers SR1 to SR6 in each nozzle shroud NS1 to NS6. As such, the plurality of swirlers SR1 to SR6 may evenly mix compressed air and fuel with each other in the nozzle shroud NS1 to NS6.

On the one hand, the central nozzle CN may be disposed in an internal central portion of the nozzle casing 1210 and enclosed by the plurality of main nozzles ON1 to ON6 disposed along the annular imaginary line. In the same manner as the plurality of main nozzles ON1 to ON6, fuel and compressed air are mixed with each other in the central nozzle CN, and the mixture of the fuel and the compressed air may be injected into the combustion chamber 1240. However, depending on the type of combustor 1200, the central nozzle CN may be omitted from the interior of the nozzle casing 1210.

The central nozzle CN may include a nozzle shroud NS0, an injection cylinder IC0, and a plurality of swirlers SR0.

The nozzle shroud NS0 may be a member enclosing the injection cylinder IC0 and the plurality swirlers SR0, and may extend along a direction in which compressed air and fuel are ejected. Compressed air drawn through the liner 1250 may be supplied into the nozzle shroud NS0.

According to the present embodiment, the nozzle shroud NS0 may be formed of a tubular member having a constant diameter. The diameter of at least an upper region of the nozzle shroud NS0 is constant. In other words, the diameter of a portion of the nozzle shroud NS0 from the inlet to a predetermined position is constant. In FIG. 3, although the diameter of the entirety of the nozzle shroud NS0 is illustrated as being constant, it is not limited thereto, and the diameter of the nozzle shroud NS0 may be constant in only a section (upper region) thereof from the inlet to the predetermined position.

According to the present embodiment, since the nozzle shroud NS0 has a constant diameter in the some section (upper region) from the inlet to the predetermined position, flow separation with respect to compressed air may be prevented from occurring around the inlet of the nozzle shroud NS0. In the present embodiment, due to the shape of the nozzle shroud NS0, flow separation of compressed air which may occur around the inlet of the nozzle shroud NS0 may be prevented. Accordingly, compressed air may be smoothly drawn into the nozzle shroud NS0, and compressed air and fuel may be evenly mixed with each other in the nozzle shroud NS0.

In the present embodiment, since the nozzle shrouds NS1 to NS6 of the plurality of main nozzles ON1 to ON6 and the nozzle shrouds NS0 of the central nozzle CN each are formed of a tubular member having a constant diameter, the distance between adjacent nozzle shrouds NS1 to NS6 and NS0 may be reduced. In the case of the nozzle shrouds NS1 and NS0 each having a bell mouth shape shown in FIG. 6, since the diameter of the inlet is greater than that of other portions, there is no alternative but for the distance between adjacent nozzle shroud NS1 and NS0 to increase.

Therefore, according to the present embodiment, the distance between adjacent nozzle shrouds NS1 to NS6 and NS0 may be reduced, so that the size of the combustor may be reduced.

In the same manner as the nozzle shrouds NS1 to NS6 of the plurality of main nozzles ON1 to ON6, a plurality of through holes TH may be formed in an inlet region of the nozzle shroud NS0 of the central nozzle CN. The plurality of through holes TH may be holes passing through the nozzle shroud NS0, so that compressed air drawn into the nozzle casing 120 may be supplied into the nozzle shroud NS0 through the plurality of through holes TH. Thereby, compressed air may be drawn into the nozzle shroud NS0 not only through the inlet of the nozzle shroud NS0 but also in a lateral direction of the nozzle shroud NS0.

In the present embodiment, the plurality of through holes TH may be formed in an entire region along a circumferential direction of the nozzle shroud NS0. Although the plurality of through holes TH may be formed in only some section of the nozzle shroud NS1 to NS6 of each of the plurality of main nozzles ON1 to ON6, the plurality of through holes TH are formed in the entire section along the circumferential direction in the nozzle shroud NS0 of the central nozzle CN.

On the one hand, the plurality of swirlers SR0 to be used to inject fuel into the nozzle shroud NS0 may be disposed on an outer circumferential surface of the injection cylinder IC0. Fuel injected into the nozzle shroud NS0 by the plurality of swirlers SR0 may be mixed with compressed air drawn into the nozzle shroud NS0. Here, compressed air and fuel may be swirled by the plurality of swirlers SR0 in the nozzle shroud NS0. As such, the plurality of swirlers SR0 may uniformly mix compressed air and fuel with each other in the nozzle shroud NS0.

Referring again to FIG. 2, the plurality of liners 1250 are respectively disposed at downstream sides of the plurality of burners 1220. In the combustion chamber 1240 formed in each of the plurality of liners 1250, fuel and compressed air ejected from the combustion nozzles 1230 of the burner 1220 may be combusted. Here, since the plurality liners 1250 are respectively coupled to the plurality of burners 1220 disposed along an annular imaginary line, the plurality of liners 1250 may also be disposed along the annular imaginary line.

Each of the plurality of liners 1250 may have a double-shell structure including an inner liner 1253 and an outer liner 1251. In other words, each liner 1250 may have a double-shell structure in which the outer liner 1251 encloses the inner liner 1253. Here, the inner liner 1253 is a hollow tubular member, and fuel and compressed air are combusted in an internal space, i.e., the combustion chamber 1240, defined in the inner liner 1253.

On the one hand, the transition piece 1260 is disposed at a downstream side of the liner 1250. The transition piece 1260 may transfer high-pressure gas generated in the liner 1250 to the turbine 1300 at high speeds. The transition piece 1260 may have a double-shell structure including an inner transition piece 1263 and an outer transition piece 1261. In other words, the transition piece 1260 may have a double-shell structure in which the outer transition piece 1261 encloses the inner transition piece 1263. Here, the inner transition piece 1263 is also a hollow tubular member in the same manner as that of the inner liner 1253, but the inner transition piece 1263 may have a shape in which the diameter thereof is gradually reduced form the liner 1250 to the turbine 1300.

The inner liner 1253 and the inner transition piece 1263 may be coupled to each other by a plate spring seal (not shown). Because one end of the inner liner 1253 and one end of the inner transition piece 1263 are respectively fixed to the combustor 1200 and the turbine 1300, the plate spring seal (not shown) should have a structure capable of absorbing length and diameter extension due to thermal expansion so as to reliably support the inner liner 1253 and the inner transition piece 1263.

Furthermore, there is a need to appropriately cool the combustor 1200 because the combustor 1200 forms the highest temperature environment in the gas turbine 1000. Compressed air flows along outer surfaces of the liner 1250 and the transition piece 1260 through which high-temperature combustion gas flows, and then is supplied toward the combustion nozzles 1230. During this process, the liner 1250 and the transition piece 1260 that have been heated by high-temperature combustion gas may be appropriately cooled.

The gas turbine 1000 in accordance with the present embodiment has a structure in which the outer liner 1251 and the outer transition piece 1261 enclose the inner liner 1253 and the inner transition piece 1263. Compressed air may pass both through an annular space between the inner liner 1253 and the outer liner 1251 and through an annular space between the inner transition piece 1263 and the outer transition piece 1261. Compressed air passing through these annular spaces may cool the inner liner 1253 and the inner transition piece 1263.

On the one hand, a plurality of first cooling holes 1265 may be formed in the outer transition piece 1261 enclosing the inner transition piece 1263. The plurality of first cooling holes 1265 are holes passing through the outer transition piece 1261. Air (hereinafter, referred to as "jet flow") passing through the plurality of first cooling holes 1265 may perpendicularly collide with the outer surface of the inner transition piece 1263 and cool the inner transition piece 1263.

A plurality of second cooling holes 1255 may be formed in the outer liner 1251 enclosing the inner liner 1253. The plurality of second cooling holes 1255 are holes passing through the outer liner 1251. In the same manner as the above-mentioned first cooling holes 1265, jet flows passing through the plurality of second cooling holes 1255 may perpendicularly collide with the outer surface of the inner liner 1253 and cool the inner liner 1253.

On the one hand, high-temperature and high-pressure combustion gas generated from the combustor 1200 is supplied to the turbine 1300 through the liner 1250 and the transition piece 1260. In the turbine 1300, combustion gas expands through an adiabatic expansion process and collides with a plurality of turbine blades 1310 radially disposed on the rotating shaft of the turbine 1300 so that reaction force is applied to the turbine blades 1310. Thus, thermal energy of the combustion gas is converted into mechanical energy by which the rotating shaft is rotated. Some of the mechanical energy obtained in the turbine 1300 is supplied as energy needed to compress air in the compressor, and the residual mechanical energy is used as valid energy for driving a generator to produce electric power, or the like.

As described above, in a combustion and a gas turbine in accordance with the present disclosure, fuel and compressed air may be evenly mixed with each other in a combustion nozzle.

Furthermore, since the distance between adjacent nozzle shrouds may be reduced, the size of the combustor may be reduced.

While the present disclosure has been described with respect to the various embodiments as exemplarily described above, it will be apparent to those skilled in the art that various changes or modifications of the present disclosure and the claimed invention are directly or indirectly motivated and embodied by adding, changing, or deleting components without departing from the spirit and scope of the claimed invention as defined in the following claims. It should be noted that these changes or modifications also fall within the bounds of the present disclosure and the claimed invention.

As such, although the present disclosure has been described with respect to the limited embodiments and drawings, the present disclosure is not limited to these. Those skilled in the art are able to appreciate that various changes and modifications are possible within the scope defined by the technical spirit of the claimed invention and other equivalents to the accompanying claims.

What is claimed is:

1. A combustor comprising;
   a nozzle casing, and a plurality of combustion nozzles spaced apart from each other in the nozzle casing, the plurality of combustion nozzles configured to eject a mixture of fuel and compressed air,
wherein the plurality of combustion nozzles comprises a central nozzle and a plurality of main nozzles that are located adjacent to an inner circumferential surface of the nozzle casing and encircle the central nozzle, and
wherein each of the plurality of main nozzles comprises:
a nozzle shroud including
an inlet through which the compressed air is drawn into the nozzle shroud,
an outlet through which the compressed air drawn from the inlet is discharged out of the nozzle shroud,
an inlet region that is disposed toward the inlet and has a constant diameter along a longitudinal direction of the nozzle shroud, and
a plurality of through holes passing through the inlet region in a radial direction of the nozzle shroud;
an injection cylinder that is disposed in the nozzle shroud and extends in one direction; and
a plurality of swirlers disposed on an outer circumferential surface of the injection cylinder at positions spaced apart from each other along a circumferential direction of the injection cylinder, the plurality of swirlers configured to mix the fuel and the compressed air in the nozzle shroud:
wherein, when viewed from the inlet to the outlet, the plurality of through holes only extend partially around a portion of the nozzle shroud in the circumferential direction of the nozzle shroud, wherein a remaining portion of the nozzle shroud in the circumferential direction has no through holes, and wherein the portion of the nozzle shroud having the plurality of through holes extends around less than half of a circumference of the nozzle shroud and
faces the inner circumferential surface of the nozzle casing.

2. The combustor according to claim 1, wherein the nozzle shroud has a constant diameter from the inlet to the outlet along the longitudinal direction of the nozzle shroud.

3. The combustor according to claim 1, wherein the constant diameter of the inlet region extends from the inlet to a predetermined distance along the longitudinal direction of the nozzle shroud.

4. The combustor according to claim 1, wherein the plurality of through holes are disposed at positions spaced apart from each other along the circumferential direction of the nozzle shroud.

5. The combustor according to claim 1, wherein diameters of the plurality of through holes are identical with each other.

6. The combustor according to claim 1, wherein diameters of the plurality of through holes are increased from the inlet to the outlet.

7. The combustor according to claim 1, wherein diameters of the plurality of through holes are increased from the inlet to a predetermined position and then reduced from the predetermined position to the outlet.

8. The combustor according to claim 1, wherein an end of the nozzle shroud that is adjacent to the inlet has a tapered shape.

9. The combustor according to claim 1, wherein an end of the nozzle shroud that is adjacent to the inlet has a round shape.

10. A gas turbine comprising:
a compressor configured to compress air drawn thereinto,
a combustor configured to produce combustion gas by combusting a mixture of fuel and compressed air from the compressor, and
a turbine including a plurality of turbine blades configured to be rotated by the combustion gas,
wherein the combustor comprises:
a nozzle casing, and
a plurality of combustion nozzles spaced apart from each other in the nozzle casing, the plurality of combustion nozzles configured to eject a mixture of fuel and the compressed air,
wherein the plurality of combustion nozzles comprises:
a central nozzle and
a plurality of main nozzles that are located adjacent to an inner circumferential surface of the nozzle casing and encircle the central nozzle, and
wherein each of the plurality of main nozzles comprises:
a nozzle shroud including
an inlet through which the compressed air is drawn into the nozzle shroud,
an outlet through which the compressed air drawn from the inlet is discharged out of the nozzle shroud,
an inlet region that is disposed toward the inlet and has a constant diameter along a longitudinal direction of the nozzle shroud, and
a plurality of through holes passing through the inlet region in a radial direction of the nozzle shroud;
an injection cylinder that is disposed in the nozzle shroud and extends in one direction; and
a plurality of swirlers disposed on an outer circumferential surface of the injection cylinder at positions spaced apart from each other along a circumferential direction of the injection cylinder, the plurality of swirlers configured to mix the fuel and the compressed air in the nozzle shroud:
wherein, when viewed from the inlet to the outlet, the plurality of through holes only extend partially around a portion of the nozzle shroud in the circumferential direction of the nozzle shroud, wherein a remaining portion of the nozzle shroud in the circumferential direction has no through holes, and wherein the portion of the nozzle shroud including the plurality of through holes extends around less than half of a circumference of the nozzle shroud and faces the inner circumferential surface of the nozzle casing.

11. The gas turbine according to claim 10, wherein the nozzle shroud has a constant diameter from the inlet to the outlet along the longitudinal direction of the nozzle shroud.

12. The gas turbine according to claim 10, wherein the constant diameter of the inlet region extends from the inlet to a predetermined distance along the longitudinal direction of the nozzle shroud.

13. The gas turbine according to claim 10, wherein the plurality of through holes are disposed at positions spaced apart from each other along the circumferential direction of the nozzle shroud.

14. The gas turbine according to claim 10, wherein diameters of the plurality of through holes are identical with each other.

15. The gas turbine according to claim 10, wherein diameters of the plurality of through holes are increased from the inlet to the outlet.

16. The gas turbine according to claim 10, wherein diameters of the plurality of through holes are increased from the inlet to a predetermined position and then reduced from the predetermined position to the outlet.

\* \* \* \* \*